May 7, 1935.  W. N. GILBERT  2,000,168
SCALE BASE SYSTEM
Filed Jan. 15, 1932   3 Sheets-Sheet 1
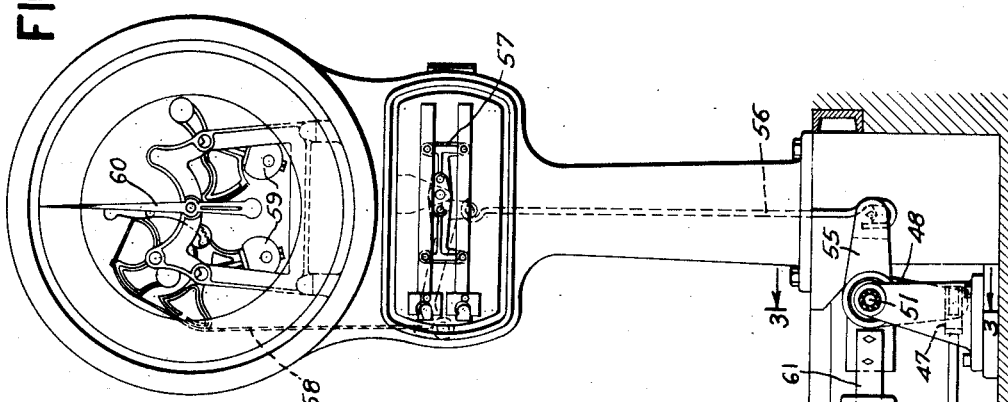
INVENTOR-
William N. Gilbert
BY
A. C. Maby
ATTORNEY- May 7, 1935. W. N. GILBERT 2,000,168
SCALE BASE SYSTEM
Filed Jan. 15, 1932 3 Sheets-Sheet 2

May 7, 1935.  W. N. GILBERT  2,000,168

SCALE BASE SYSTEM

Filed Jan. 15, 1932  3 Sheets-Sheet 3

INVENTOR-
William N. Gilbert
BY
ATTORNEY-

Patented May 7, 1935

2,000,168

UNITED STATES PATENT OFFICE 2,000,168

SCALE BASE SYSTEM

William N. Gilbert, Hudson Heights, N. J., assignor, by mesne assignments, to International Business Machines Corporation, New York, N. Y., a corporation of New York Application January 15, 1932, Serial No. 586,777

5 Claims. (Cl. 265—71)

This case relates to equilibrium machines especially weighing scales.

In general, the object of the invention is to provide a novel lever system for transmitting forces to a resistant or counterbalancing mechanism.

Further the object is to provide a load supporting base lever system which will transmit the load differentially instead of additively to counterbalancing mechanism.

Still further, the object is to provide a scale of the platform type with the levers arranged to be housed in a shallow base.

Another object is to obviate the use of heavy levers ordinarily required for weighing heavy loads and instead provide a system of links which operates to transmit a small fraction of the load to the counterbalancing mechanism.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is an elevation of the scale with the base in section.

Fig. 2 is a detail of a tie-rod connection between lever units at the front and back of the base lever system.

Fig. 3 is a detail section along line 3—3 of Fig. 1.

Fig. 4 is a line diagram of one form of the novel lever unit;

Fig. 5 is a line diagram of another form of lever unit,

Figure 6:
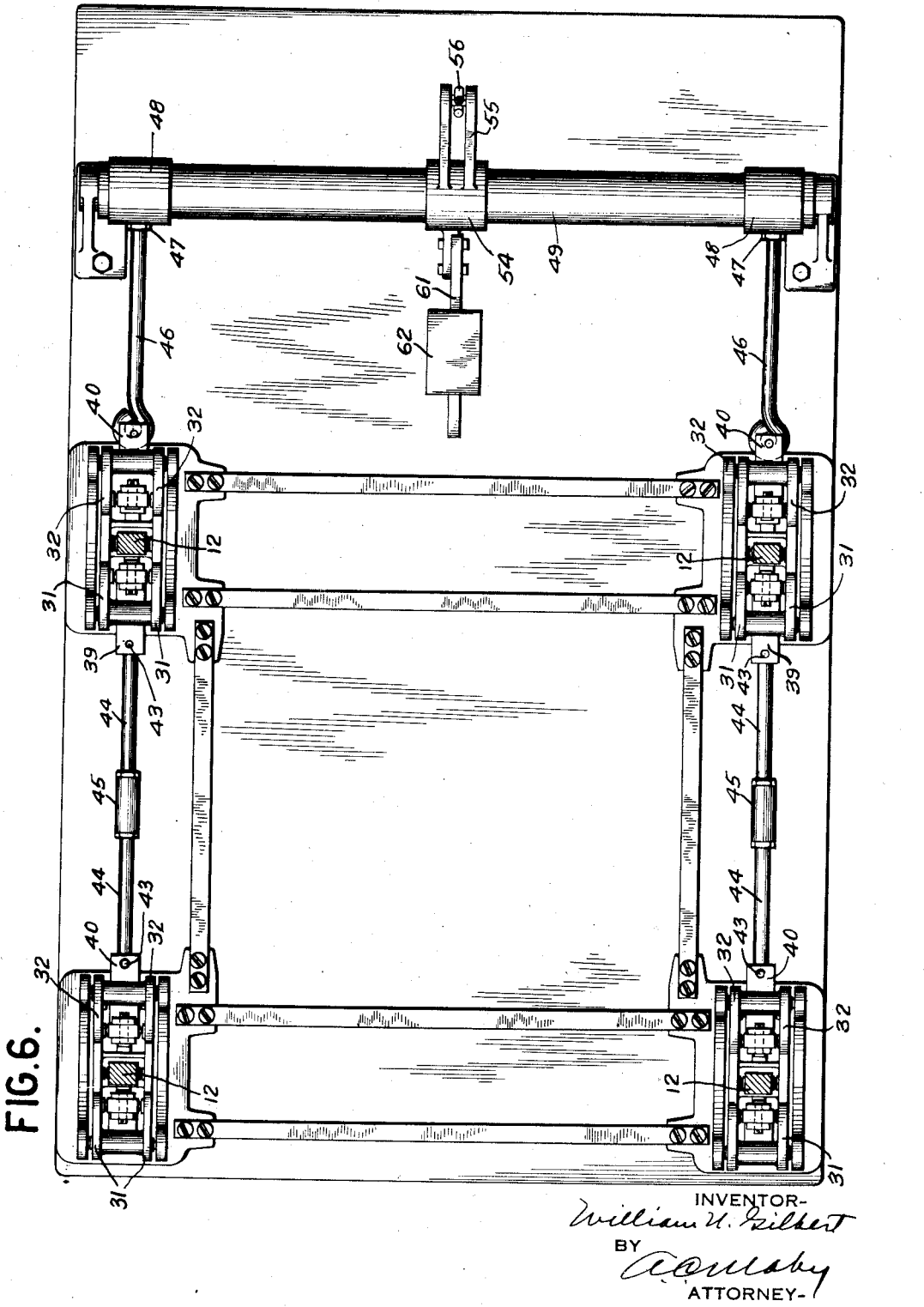
Fig. 6 is a plan view of the base system with the platform and spider omitted.
Figure 7:
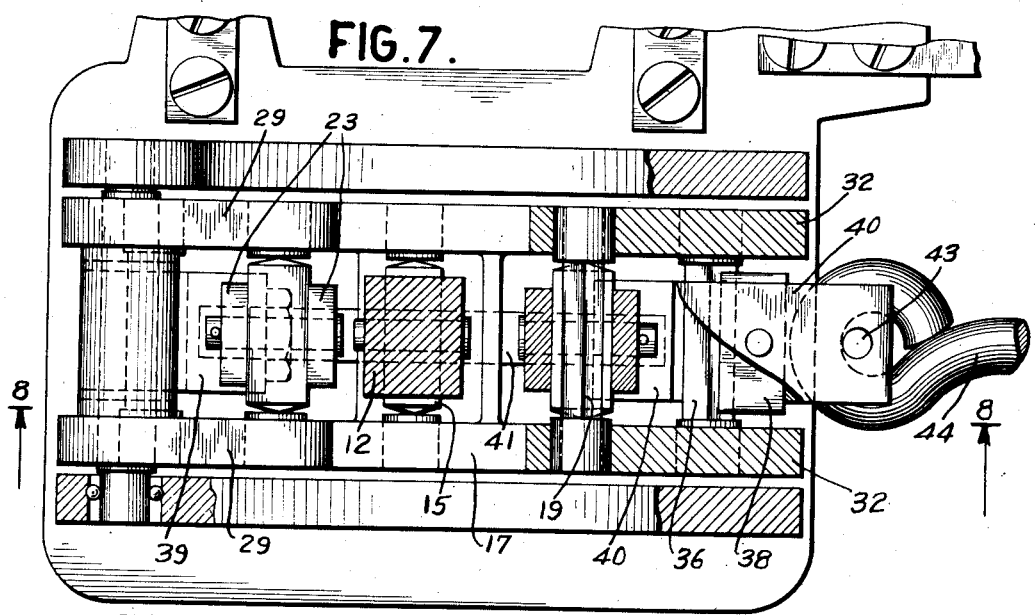
Fig. 7 is a plan detail view of a lever or link unit.

Referring to the drawings in detail, 10 is the platform mounted on spider 11 which has four feet 12, one at each corner. The lower end of each foot has a pin 14 on which is swiveled a V-groove bearing block 15 resting on a knife edge 16 fixed in a factor lever 17. A factor lever is one which splits or factors the load or force applied thereto into two divisions and transmits each division separately. The factor lever has at opposite ends knife edges 18 and 19 respectively seated on V-groove bearing blocks 20 and 21 pinned by studs 22 to their respective vertical links 23 and 24. At their upper ends, links 23 and 24 respectively carry V-blocks 25 and 26 coacting with associated knife edges 27 and 28 secured in the ends of horizontal arms 29 and 30 of bell levers 31 and 32. The lower ends of the vertical arms 33 and 34 carry knife edges 35 and 36 the sides of which engage the bearing blocks 37 and 38 pinned to members 39 and 40. The members 39 and 40 are internally threaded to receive the threaded ends of tie rod 41, the rod being held in adjusted position relative to members 39 and 40 by nuts 42.

Member 40 of the left hand link unit (as viewed in Fig. 1) has a pin 43 at its free end engaged with the eye at the end of a rod 44. Similarly, a rod 44 is hooked to a pin 43 carried by the member 39 of the right hand link unit. Two rods 44 at one side of the base are adjustably joined by a turnbuckle 45 and thus connect a pair of lever or link units at each side of the base.

Fig. 2 shows a modified connection between a pair of lever units on which rods 44 are replaced by cables 44' connected by a turnbuckle 45'.

Figure 8:
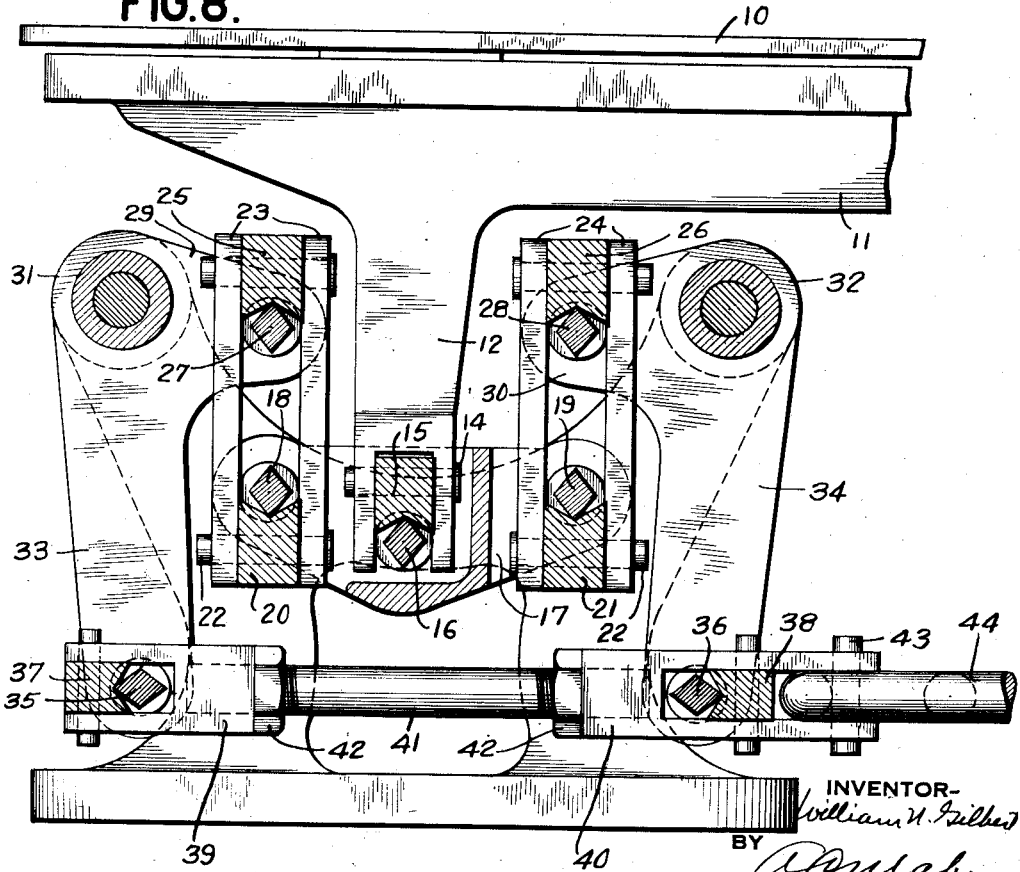
Fig. 8 is a section on line 8—8 of Fig. 7.

To each member 40 of the right hand link units is hooked one end of a rod 46 which is threaded at its other end into a buckle 47 having a knife edge connection with the lower end of an arm 48 similar to the knife edge connection between member 39 and lever 31 shown in Fig. 8.

Arms 48, as shown in Figs. 1, 3, and 6, are formed as collars at their upper ends to embrace the ends of a shaft formed as a pipe section 49 to which they are made fast. The ends of the pipe section are provided with disks 50 (see Fig. 3) having studs 51 coacting with ball bearings 52 in the frame standards 53 to rotatably mount the shaft 49 on the frame.

Between its ends, shaft 49 has fastened thereto a collar 54 rigid with a horizontal arm 55 connected by draft rod 56 to intermediate lever 57. Lever 57 in turn is connected by a tape 58 to an automatic counterbalancing system comprising pendulums 59 and automatic registering means 60.

Extending oppositely to arm 55 is an arm 61 fast to the collar 54. Arm 61 carries a back weight 62 which is adapted to counteract the dead weight of the platform, the levers, the pendulums, and other movable parts and to adjust the scale to zero position when there is no load on the platform.

The theory of operation of the scale may be explained in connection with the line diagram (Fig. 4) of a single lever or link unit of the base system.

Let $F$ equal the gravitational force of a load transmitted through one foot 12 to a factor lever 17.

Let $f$ equal the force transmitted to link 23.

Let $f'$ equal the force transmitted to link 24.

Let $f^2$ equal the force transmitted by lever 31 to tie rod 41.

Let $f^3$ equal the force transmitted by lever 32 to tie rod 41.

Let $a$ equal the distance between the point of application of force $F$ on factor lever 17 and the connection of said factor lever 17 to link 23.

Let $b$ equal the distance between the point of application of force $F$ and the engagement of factor lever 17 with link 24.

Let $k$ equal the proportion of the horizontal arm 29 to the vertical arm 33 of lever 31.

Let $k'$ represent the proportion of the horizontal arm 30 to the vertical arm 34 of lever 32.

The relations between the various forces may then be expressed as follows:

(1) $\quad f = F \times \dfrac{b}{a+b}$ (2) $\quad f' = F \times \dfrac{a}{a+b}$ (3) $\quad f^2 = f \times k$ (4) $\quad\quad = F \times \dfrac{b}{a+b} \times k$ (5) $\quad f^3 = f' \times k'$ (6) $\quad\quad = F \times \dfrac{a}{a+b} \times k'$ (7) $\quad f^2 - f^3 = \dfrac{F}{a+b}(bk - ak')$ Assuming that $k'$ equals $k$ Equation 7 becomes (8) $\quad f^2 - f^3 = \dfrac{Fk}{a+b}(b - a)$ From Equation 8, it is apparent that when $b$ equals $a$, $f^2 - f^3 = 0$.

Equation 8 also brings out the fact that as the difference between $a$ and $b$ increases, the difference between forces $f^2$ and $f^3$ becomes greater and as the difference between $a$ and $b$ decreases, the difference between $f^2$ and $f^3$ decreases.

Assuming that $b$ equals $a$ and that $k$ is greater than $k'$, this condition being shown diagrammatically in Fig. 5, Equation 7 becomes (9) $\quad f^2 - f^3 = \dfrac{Fa}{a+b}(k - k')$ The difference between forces $f^2$ and $f^3$ is seen from Equation 9 to depend solely on the difference between $k$ and $k'$.

Where both $a$ and $b$ and $k$ and $k'$ are unequal, then the difference between $f^2$ and $f^3$ depends on the differences between $a$ and $b$ and between $k$ and $k'$.

One chief advantage of the above system is that a large reduction in power between the applied load, force $F$, and the force transmitted to rod 41 (equal to $f^2 - f^3$) may be obtained with small links and without the use of large levers, the power arms of which must be far greater than the load arms to obtain the same reduction in power thus appreciably departing from the ideal condition of a weight beam which is that the opposite arms of a weight beam should be equal. The large reduction in power is obtained according to the present invention as may be apparent from the mathematical explanation by factoring the load into two unequal opposing forces whereas in the usual lever systems, the power reduction is directly proportional to the ratio of the moment arms of the base levers.

Due to the large reduction in power between applied and transmitted load obtained without detracting from the efficiency of the scale, it follows that the balancing force may be correspondingly smaller and accordingly that smaller pendulums or springs may be used.

The four link units, one at each corner, are made alike to transmit the same resultant force $f^2 - f^3$ to the tie rods 41. The total force acting on shaft 49 is proportional to the sum of the forces transmitted by each link unit.

To make clear the operation of the scale, the following concrete example may be given. Assume a load of 408 pounds on the platform, and link units according to the scheme of Fig. 4, with $b$ equal to $1\frac{1}{8}''$, $a$ equal to $1''$, and $k$ and $k'$ each equal to $\frac{1}{2}''$. The load $F$ on each link unit will be $$\dfrac{408}{4} = 102\#.$$

Repeating Equation 8, derived above, the resultant force acting on a tie rod 41 is $$f^2 - f^3 = \dfrac{Fk}{a+b}(b - a)$$

Substituting the assumed values, $$f^2 - f^3 = \dfrac{102 \times \frac{1}{2}}{1'' + 1\frac{1}{8}''}(1\frac{1}{8}'' - 1'')$$

$$= \dfrac{51}{17} pounds = 3\ pounds$$

Each link unit will transmit 3 pounds to the shaft 49. The four link units will together transmit 12 pounds to shaft 49. The shaft 49 will in turn transmit this force to the draft rod 56 and from there to intermediate lever 57, counterbalances 59 and registering means 60.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

1. In an equilibrium machine, a factor lever, a member movable downwardly under the influence of a load force and connected to a point of said factor lever unequally distant from the ends of the latter to divide the latter into two unequal arms bearing unequal divisions of the force applied by said member at said point, a pair of lever elements immovable relatively to each other, each having a load arm and a power arm with the load arm connected to one of said factor lever arms, said lever elements being fulcrumed to tend to rock in opposite directions under the influence of the force divisions applied thereto by said factor lever, a force counterbalancing device, and operative connections between the device and the power arm of each lever element to influence the device in accordance with the resultant of the forces transmitted by said power arms to the latter connections.

2. In an equilibrium machine, as a subcombination, a member movable under the influence of a force, a factor lever to which said member is connected at a point unequally distant from the ends to be divided into unequal arms bearing unequal divisions of the force applied by said member, a pair of rockable elements, each having a load arm and a power arm with the load arm connected to one of said factor lever arms, the elements being fulcrumed to tend to rock in opposite directions under the influence of the force divisions applied thereto by said factor lever, and tying means connecting the power arms of said elements to render them relatively immovable and influenced by the resultant of the forces transmitted thereto by said power arms.

3. In an equilibrium machine, as a sub-combination, a member movable under the influence of a force, a factor lever connected to said member at a point unequally distant from the ends of the factor lever whereby the latter divides the force exerted by said member into unequal force divisions acting at the opposite ends of the factor lever, a pair of lever elements, each having a generally horizontal load arm and generally vertical power arm, connections between the opposite ends of the factor lever and the load arms for transmitting the force divisions to the lever elements, said elements being arranged to tend to rock in opposite directions under influence of the force subdivisions applied thereto by said factor lever, and a generally horizontal tying means connecting the power arms and influenced by the resultant of the forces transmitted thereto by the power arms.

4. In an equilibrium machine, a member movable downwardly under the influence of a force, a factor lever connected to said member at a point equally distant from the ends thereof to be divided into equal arms, each bearing an equal division of the force applied by said member, a pair of lever elements, each having a load arm and a power arm, the lever ratio of one element determined by the proportion of power arm to load arm being different than the lever ratio of the other element, a connection between the load arm of each element and one arm of the factor lever to be influenced by the division of force applied thereto by the associated factor lever arm, means for tying said lever elements together to constrain them to move jointly in the same direction about their fulcrums, said lever elements being fulcrumed to tend to rock in opposite directions under the influence of the force divisions applied by said factor lever, a force counterbalancing device, and connections between the power arm of each lever element and the counterbalancing device to influence the latter in accordance with the resultant of the forces transmitted to said latter connections by said power arms.

5. In an equilibrium machine, a member movable under the influence of an applied force, a factor lever connected at an intermediate point to said member to be divided thereby into two parts, a pair of bell crank levers having generally horizontal arms disposed between the fulcrums of the bell crank levers with their free ends directed towards each other, a connection between the free end of one said horizontal arms and one of the parts of said factor lever, a connection between the free end of the other said horizontal arm and the other part of said factor lever, said bell crank levers also having generally vertical arms, means for tying the power ends of said vertical arms to each other to constrain the bell crank levers to move in the same direction about their fulcrums, the effective length of one part of the factor lever and its connected horizontal arm in proportion to the length of the vertical arm associated with the latter horizontal arm being different than the proportion of the effective length of the other part of the factor lever and its connected horizontal arm to the vertical arm associated with the latter horizontal arm whereby said bell crank levers convert the force applied to the factor lever into unequal forces which by reason of the horizontal arms being oppositely directed from their respective fulcrums act at the power ends of the vertical arms in opposing directions to produce a resultant force acting on said tying means to move the latter in one direction.

WILLIAM N. GILBERT.